(12) United States Patent
Gauthier et al.

(10) Patent No.: US 8,706,783 B2
(45) Date of Patent: Apr. 22, 2014

(54) STORING HIERARCHICAL TABLE AS A MARKUP LANGUAGE FILE

(75) Inventors: Alain Gauthier, Laval (CA); Mohannad El-Jayousi, Ile-Bizard (CA); Wanling Zhang, Montreal (CA)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/570,328

(22) Filed: Aug. 9, 2012

(65) Prior Publication Data

US 2014/0046985 A1    Feb. 13, 2014

(51) Int. Cl.
*G06F 17/30* (2006.01)

(52) U.S. Cl.
USPC .......................................................... 707/812

(58) Field of Classification Search
None
See application file for complete search history.

(56) References Cited

U.S. PATENT DOCUMENTS

| 7,395,271 | B2 | 7/2008 | Idicula et al. | |
|---|---|---|---|---|
| 8,209,361 | B2 | 6/2012 | Idicula et al. | |
| 2005/0055358 | A1* | 3/2005 | Krishnaprasad et al. | 707/100 |
| 2005/0091251 | A1* | 4/2005 | Ramarao | 707/101 |
| 2006/0085409 | A1* | 4/2006 | Rys et al. | 707/3 |

* cited by examiner

*Primary Examiner* — Robert Beausoliel, Jr.
*Assistant Examiner* — Hau H Hoang

(57) ABSTRACT

Various embodiments of systems and methods for storing a hierarchical table as a markup language file are described herein. Initially the position of the cells included in the hierarchical table may be identified. The position of the plurality of cells includes a first dimension coordinate and a second dimension coordinate. The first dimension coordinate is inserted as a markup tag in the markup language file. The second dimension coordinate is inserted as a markup attribute corresponding to the markup language file. One or more cells, corresponding to a first dimension of the hierarchical table is selected. Data included in the selected cells is identified and stored in the markup attribute inserted in the markup language file.

21 Claims, 8 Drawing Sheets

```
700
<x y1 = ""     y2 = "" y3 = "January | e"    y4 = "WEEK 1 | c | y3 "    y5 = "WEEK 2 | c | y3"    y6 = "WEEK 3 | c | y3"    y7 = "WEEK 4 | c | y3"    y8 = "FEB | c" y9 = "MARCH | c"/>
<x y1 = "BEVERAGE | c"    y2 = "" y3 = "100 | L"" y4 = "25 | L"   y5 = "25 | L"   y6 = "25 | L"   y7 = "25 | L"   y8 = "200 | L"   y9 = "150| L" />
<x y1 = "FOOD | e"     y2 = "" y3 = "500 | UNITS"   y4 = "250 | UNITS"   y5 = "125 | UNITS"   y6 = "100 | UNITS"   y7 = "25 | UNITS"    y8 = "600 | L" y9 = "575| UNITS" />
<x y1 = ""    y2 = "COOKIE | c | y1"    y3 = "100 | UNITS""   y4 = "250 | UNITS"   y5 = "125 | UNITS"   y6 = "100 | UNITS"   y7 = "25 | UNITS"    y8 = "600 | L" y9 = "575| UNITS" />
<x y1 = ""    y2 = "SANDWICH | c | y1"    y3 = "400 | PACKS""   y4 = "220 | PACKS"   y5 = "85 | PACKS"   y6 = "88 | PACKS"    y7 = "7 | PACKS"    y8 = "200 | PACKS" y9 = "245| PACKS" />
```

```
<x y1 = ""        y2 = ""  y3 = " January | e"    y4 = ""  y5 = ""  y6 = ""  y7 = ""  y8 = "FEB | C"    y9 = "MARCH | C"/>
<x y1 = ""        y2 = ""  y3 = ""  y4 = "WEEK 1 | C"  y5 = "WEEK 2 | C"  y6 = "WEEK 3 | C"  y7 = "WEEK 4 | C"  y8 = ""  y9 = ""/>

<x y1 = "BEVERAGE | C"  y2 = ""  y3 = "100 | L"         y4 = "25 | L"  y5 = "25 | L"  y6 = "25 | L" y7 = "25 | L"  y8 = "200 | L" y9 = "150| L" />
<x y1 = "FOOD | C"       y2 = ""  y3 = "500 | UNITS"  y4 = "250 | UNITS"  y5 = "125 | UNITS"  y6 = "100 | UNITS" y7 = "25 | UNITS" y8 = "600 | L" y9 = "575| UNITS" />
<x y1 = ""  y2 = "COOKIE"     y3 = "100 | UNITS"  y4 = "250 | UNITS"  y5 = "125 | UNITS"  y6 = "100 | UNITS" y7 = "25 | UNITS" y8 = "600 | L" y9 = "575| UNITS" />
<x y1 = ""  y2 = "SANDWICH"  y3 = "400 | PACKS"     y4 = "220 | PACKS" y5 = "85 | PACKS"    y6 = "88 | PACKS"  y7 = "7 | PACKS"   y8 = "200 | PACKS" y9 = "245| PACKS" />
```

```
<x y3 = "January | e" y8 = "FEB | C" y9 = "MARCH | C"/>
<x y4 = "WEEK 1 | C" y5 = "WEEK 2 | C"     y6 = "WEEK 3 | C"     y7 = "WEEK 4 | C" />
<x y1 = "BEVERAGE | C"     y3 = "100 | L" y4 = "25 | L"  y5 = "25 | L"   y6 = "25 | L"   y7 = "25 | L"   y8 = "200 | L"   y9 = "150| L" />
<x y1 = "FOOD | C"     y3 = "500 | UNITS"   y4 = "250 | UNITS"   y5 = "125 | UNITS"   y6 = "100 | UNITS"   y7 = "25 | UNITS"
    y8 = "600 | L" y9 = "575| UNITS" />
<x y2 = "COOKIE"     y3 = "100 | UNITS"    y4 = "250 | UNITS"   y5 = "125 | UNITS"   y6 = "100 | UNITS"   y7 = "25 | UNITS"    y8
   = "600 | L" y9 = "575| UNITS" />
<x y2 = "SANDWICH" y3 = "400 | PACKS"   y4 = "220 | PACKS"   y5 = "85 | PACKS"    y6 = "88 | PACKS"   y7 = "7 | PACKS"    y8
   = "200 | PACKS" y9 = "245| PACKS" />
```

FIG. 6

```
<x y1 = ""      y2 = ""   y3 = "January | e"      y4 = "WEEK 1 | c | y3 "       y5 = "WEEK 2 | c | y3"        y6 = "WEEK 3 | c | y3"        y7 = 
"WEEK 4 | c | y3"      y8 = "FEB | c" y9 = "MARCH | c"/>
<x y1 = "BEVERAGE | c"    y2 = ""   y3 = "100 | L" y4 = "25 | L"     y5 = "25 | L"      y6 = "25 | L"       y7 = "25 | L"    y8 = "200 | L"   y9 = "150 | 
L" />
<x y1 = "FOOD | e"        y2 = ""   y3 = "500 | UNITS"      y4 = "250 | UNITS"       y5 = "125 | UNITS"       y6 = "100 | UNITS"         y7 = "25 | 
UNITS"         y8 = "600 | L" y9 = "575| UNITS"/>
<x y1 = ""      y2 = "COOKIE | c | y1"        y3 = "100 | UNITS"      y4 = "250 | UNITS"      y5 = "125 | UNITS"      y6 = "100 | UNITS"       y7 = 
"25 | UNITS"   y8 = "600 | L" y9 = "575| UNITS" />
<x y1 = ""      y2 = "SANDWICH | c | y1"      y3 = "400 | PACKS"      y4 = "220 | PACKS"      y5 = "85 | PACKS"      y6 = "88 | PACKS"         y7 = 
"7 | PACKS"    y8 = "200 | PACKS" y9 = "245| PACKS" />
```

STORING HIERARCHICAL TABLE AS A MARKUP LANGUAGE FILE

FIELD

Embodiments generally relate to computer systems, and more particularly to methods and systems for storing hierarchical data.

BACKGROUND

Markup language files (e.g., XML files) are commonly used for distributing data in a rapid and reliable manner. Typically, these markup language files also store the structure of the data along with the data to be transmitted. The structure of the data may be stored by organizing the elements of the markup language file according to the structure of the data. For example, a markup language file may store a structure of a hierarchical structure by arranging parent elements and child elements, of a hierarchical data, such that child elements are contained in the related parent elements.

In certain cases, the structure of the data, to be transmitted may be complex. For example a hierarchical data having multiple levels of hierarchies has a complex structure. Transmitting and parsing markup language file storing such complex structure may be cumbersome and time consuming.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 5 is a block diagram illustrating an exemplary markup language file storing the hierarchical table of FIG. 4, according to an embodiment.

FIG. 6 is a block diagram illustrating an exemplary markup language file storing the hierarchical table of FIG. 4, according to another embodiment.

FIG. 7 is a block diagram illustrating an exemplary markup language file storing the hierarchical table of FIG. 4, according to another embodiment.

DETAILED DESCRIPTION

Embodiments of techniques for storing a hierarchical table as a markup language file are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
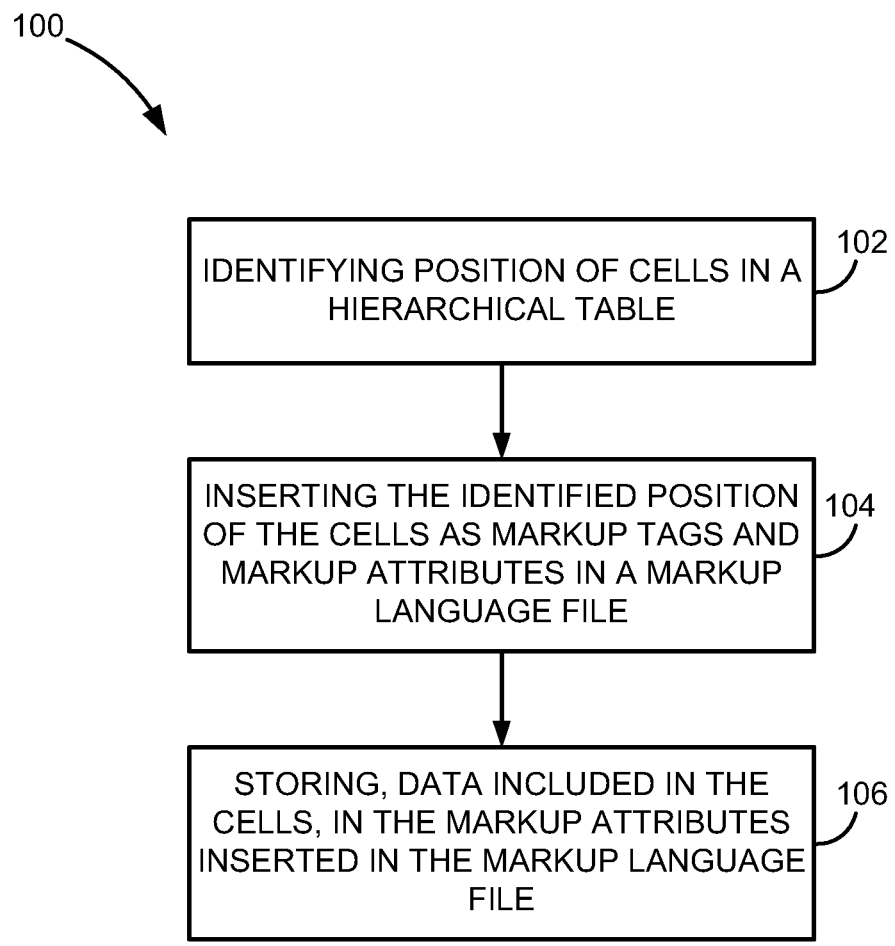
FIG. 1 is a flow diagram illustrating a method for storing a hierarchical table as a markup language file, according to an embodiment.

FIG. 1 is a flow diagram 100 illustrating a method for storing a hierarchical table as a markup language file, according to an embodiment. In one embodiment, a table is a collection of data, which is organized in columns and rows. A cell is a unit of the table where a row and a column intersect. The table may be a collection of a number of cells. In a hierarchical table, the data may be organized in a hierarchical structure represented by a parent/child relationship. For example, four rows of a 4×4 sales hierarchical table may be arranged in a hierarchical structure represented by "global sales" (parent) and "sales in USA" (child) relationship. Similarly, the four columns of the sales hierarchical table may be organized in a hierarchical structure represented by "sales in 2011" (parent) and "sales in Q1 of 2011" (child) relationship. The 4×4 sales hierarchical table has 16 cells.

In one embodiment, the rows are included in a row dimension of the hierarchical table. Similarly, the columns are included in a column dimension of the hierarchical table. A dimension is a line in a real or abstract space. An example of a real space dimension is a pair of antiparallel cardinal points on a compass, e.g., North and South, North-northwest and South-southeast. Another real dimension is time. An example of an abstract space dimension is a list of stores. Examples of dimensions include region, store, year, customer, employee, product line, and the like. In one embodiment, each row of the hierarchical table may be one unit of the row dimension. Similarly, each column of the hierarchical table may be one unit of the column dimension. In the above example, the sales hierarchical table includes a row dimension and a column dimension. The row dimension includes the four rows of the sales hierarchical table. Each of the four rows in the sales hierarchical table represents one unit of the row dimension. Similarly, the column dimension includes the four columns of the hierarchical table.

Initially at block 102, the position of the cells in the hierarchical table may be identified. The position of a cell in the hierarchical table may be identified based on the row dimension and the column dimension of the hierarchical table. In one embodiment, the unit of the row dimension and the unit of the column dimension corresponding to the cell together identify the position of the cell in the hierarchical table. In the above example, row 1 and column 1 together identify the position of the first cell, which is at the top left corner in the hierarchical table, as the unit of the row dimension and the unit of the column dimension corresponding to the first cell is row 1 and column 1, respectively. Similarly the identified position of a second cell, adjacent to the first cell in the first row, is row 1 and column 2.

Next at block 104, the position of the cells, identified at block 102, may be inserted in a markup language file. According to one embodiment, a markup language is a system for annotating a document in a way that is syntactically distinguishable from the text. A markup language file may include markup tags, which identify the data stored in the markup language file. The markup language file may also include markup attributes corresponding to markup tags, which may store the data identified by the markup tag. As discussed above, the position of a cell in a hierarchical table includes the unit of row dimension and the unit of column dimension corresponding to the cell. In one embodiment, the unit of one of the dimensions, row dimension or column dimension, included in the position of cell may be inserted as a markup tag in the markup language file. Further, the unit of the other dimension, column dimension or row dimension, included in the position of the cell may be inserted as a markup attribute corresponding to the markup tag. In the above example, the unit of the row dimension (row 1) included in the identified position of the first cell may be inserted as a first markup tag in the hierarchical table. Further, the unit of the column dimension (column 1) included in the position of the first cell may be inserted as a first markup attribute corresponding to the first markup tag. The markup tags and attributes, inserted in the markup language file, may together represent the position of the cells in the hierarchical table.

Finally at block 106, the data included in the cells of the hierarchical table are stored in the markup attribute, inserted at block 104, of the markup language file. In the above example, assume that the first cell of the sales hierarchical table stored the data "sales table". The data "sales table", stored in the first cell, may be stored in the first attribute, inserted in the markup language file at block 104. A markup language file storing the hierarchical table may be obtained after the data in each cell of the hierarchical table is stored in the markup attributes inserted in the markup language file.

In one embodiment, a parser may parse the markup language file to obtain the hierarchical table. As the markup language file stores the position and the data of each cell in the hierarchical table, a parser may easily obtain the hierarchical table from the markup language file without any knowledge of the hierarchical information in the hierarchical table. Further, since the position of the cells in the hierarchical table is inserted as markup tags and attributes in the markup language file, the parser does not need knowledge about user defined tags and attribute names for parsing the markup language file. This may considerably reduce the time required by the parser, for obtaining the hierarchical table from the markup language file.

Figure 2:
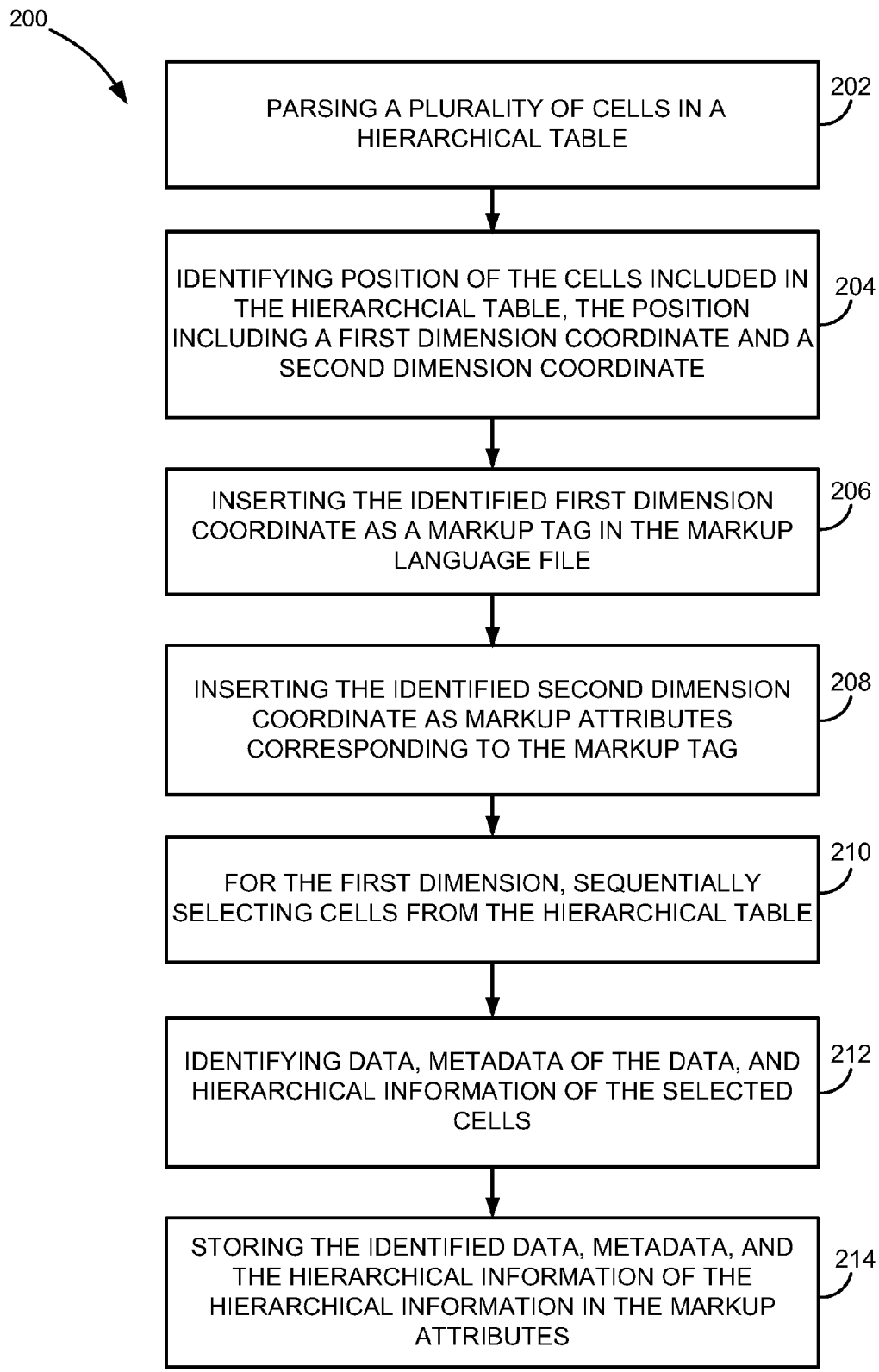
FIG. 2 is a detailed flow diagram illustrating a method for storing a hierarchical table as a markup language file, according to an embodiment.

FIG. 2 is a detailed flow diagram 200 illustrating a method for storing a hierarchical table as a markup language file, according to an embodiment. The hierarchical table may be a collection of data arranged using a model of rows and columns Each row in a table is referred to as a record. Records may store individual pieces of information. Each record consists of one or more fields. Fields correspond to the columns in the table. For example, a hierarchical table "Employees" may have a record (row) that contains information about different employees, and each field (column) may contain a specific type of information about the employee, such as first name, last name, address, etc. In one embodiment, the hierarchical table may be a multi-level hierarchical table. A multi-level hierarchical table may include multiple levels of hierarchy on the row dimension and/or the column dimension. For example, consider a 5×7 population hierarchical table shown in table 1. The row dimension of the population hierarchical table has five rows arranged according to three levels of hierarchy represented by "ALL AGES", "AGES BELOW 50 YEARS", and "AGES BELOW 25 YEARS". The column dimension of the population hierarchical table includes seven columns arranged according to two levels of hierarchy ("EUROPE" and "GERMANY", "FRANCE"). The "population" hierarchical table is a multi-level hierarchical table as the row dimension has three levels of hierarchy ("ALL AGES" (parent)—"AGES BELOW 50 YEARS" (child)—"AGE BELOW 25 YEARS" (grandchild)) and the columns dimension has two levels of hierarchy (EUROPE (PARENT)—GERMANY AND FRANCE (CHILD)).

TABLE 1

|  |  |  | ▽EUROPE | ▷GERMANY | ▷FRANCE | ▷USA |
|---|---|---|---|---|---|---|
| ▽ALL AGES |  |  | 150M | 75M | 75M | 200M |
|  | ▽AGES < 50 |  | 100M | 50M | 50M | 150M |
|  |  | ▷AGES < 25 | 50M | 25M | 25M | 100M |

For storing the hierarchical table as a markup language file, initially at block 202, the plurality of cells in the hierarchical table may be parsed. A cell is a unit of the table where a column and row of the table intersect. For example, the 5×7 population hierarchical table has 35 cells as there are 35 intersections between the 5 rows and the 7 columns of the hierarchical table. In one embodiment, parsing is the process of analyzing the cells of the hierarchical table to identify information related to the cells. The parsing of the cells in the hierarchical table may be performed one by one in a sequential order. In the population hierarchical table, each of the 35 cells may be parsed to identify the information related to the 35 cells.

Next at block 204, based on the parsing of the cells performed at block 202, position of the cells in the hierarchical table may be identified. Position refers to the spatial location of an entity. In one embodiment, the position of each cell in the hierarchical table may be identified with respect to the other cells in the hierarchical table. The identified position of each cell in the hierarchical table may be a combination of a first dimension coordinate and a second dimension coordinate of the cell. A first dimension of the hierarchical table may either be a row dimension or a column dimension of the hierarchical table. Similarly, a second dimension of the hierarchical table may be a dimension, column dimension or a row dimension, other than the first dimension, of the hierarchical table. In one embodiment, the first dimension and the second dimension of the hierarchical table may be along one of the axes of a two-dimensional Cartesian coordinate system. A typical Cartesian coordinate system specifies each point uniquely in a plane by a pair of numerical coordinates, which are the distances of the point from two fixed perpendicular directed lines, measured in the same unit of length. A reference line may be referred to as a coordinate axis or an axis of the system. An axis is a reference line from which distances or angles are measured in a coordinate system. The axis may be the X-axis, which is a reference line in horizontal direction, or a Y-axis, which is a reference line in vertical direction. The axis corresponding to the first dimension and the second dimension may be referred to as the first dimension axis and the second dimension axis, respectively. In one embodiment, identifying the position of the cells in the hierarchical table may include identifying the first dimension axis and the second dimension axis of the hierarchical table. In the above example, assume that the row dimension is the first dimension and the column dimension is the second dimension of the population hierarchical table. As the first dimension (row dimension) of the population hierarchical table is in a horizontal direction, the first dimension axis (row dimension axis) of the hierarchical table may be the X-axis. Similarly, as the second dimension (column dimension) of the population hierarchical table is in the vertical direction, the second dimension axis (column dimension axis) may be the Y-axis.

In one embodiment, the first dimension coordinate and the second dimension coordinate of a cell is measured with respect to the first dimension axis and the second dimension axis, respectively, of the hierarchical table. A coordinate is a value that defines the position of a point, line, or the like, with reference to a fixed figure, system of lines, etc. The reference for identifying the first dimension coordinate and the second dimension coordinate may be the first dimension axis and the second dimension axis, respectively. In one embodiment, the first dimension coordinate is a combination of the first dimension axis and a unique identifier that identifies the position of the cell with respect to the first dimension. For example, if the first dimension is the row dimension then the unique identifier may be a row number of the unit of row dimension corresponding to the cell. Similarly, the second dimension coordinate is a combination of the second dimension axis and a unique identifier that identifies the position of the cell with respect to a unit of the second dimension. In the above example, the first dimension coordinate of the cell at the intersection of row 1 and column 1 in the population hierarchical table may be X1, which is a combination of the first dimension axis (X) and the unique identifier (1) that identifies the position of the first cell with respect to the first (row) dimension. In this case, the unique identifier 1 is the row number of the unit of row dimension (first row) corresponding to the first cell. Similarly, the second dimension coordinate of the first cell may be Y1, which is a combination of the second dimension axis (Y) and the unique identifier (1) that identifies the position of the first cell with respect to the second (column) dimension. The unique identifier is the column number of the unit of column dimension (column 1) corresponding to the first cell.

In one embodiment, the first dimension coordinate and the second dimension coordinate of the cell together represent the position of the cell in the hierarchical table. For example, the first dimension coordinate and the second dimension coordinate, X1 Y1, together identify the position of the first cell at the intersection of the first row and the first column of the population hierarchical table.

Next at block 206, the first dimension coordinate is inserted as a markup tag in a markup language file. A markup language is used for annotating a document in a way that is syntactically distinguishable from the text. Examples of markup language include extensible markup language (XML), hypertext markup language (HTML), etc. The markup language file may include markup tags, which identify the data stored in the markup language file. In one embodiment the first dimension coordinate, included in the identified position of the cell at block 204, is inserted as a markup tag, such as XML tag, in the markup language file. Each markup tag in the hierarchical table may represent one unit of the first dimension of the hierarchical table. In the above example, one unit of the first dimension coordinate X1, included in the identified position X1Y1 of the cell at the intersection of row 1 and column 1 in the population hierarchical table, may be inserted as a markup tag in the markup language file. Five markup tags X1, X2, X3, X4, and X5, which are the first dimension coordinate corresponding to each unit of the row dimension may be inserted in the markup language file.

In one embodiment, a first dimension axis, corresponding to each unit of the first dimension, may be inserted as a markup tag in the markup language file. In the above example, five markup tags X, X, X, X, and X, which are the first dimension axis corresponding to each unit of the first (row) dimension may be inserted in the markup language file.

Next at block 208, the second dimension coordinate, included in the position of the cell identified at block 204, is inserted as a markup attribute in the markup language file. The markup attribute, being inserted in the markup language file, may be corresponding to the markup tag inserted in the markup language file at block 206. Markup attributes may be associated with the markup tag to further define the tags. In one embodiment, the syntax of a markup tag and markup attributes corresponding to the markup tag may be: <markup_tag markup_attribute_1="data" markup_attribute_2="data"...>. In one embodiment, one markup attribute may be inserted, in the markup language file, for each cell of the hierarchical table. As the markup attributes inserted in the markup language file has a 1:1 relationship with the number of cells in the hierarchical table, there is no duplication of markup tag names and markup attribute names, of the markup attributes, corresponding to the markup tags. In the above example, the second (column) dimension coordinates, included in the positions of the cells identified at block 204, may be Y1-Y7, which is a combination of the column dimension axis (Y-axis) and a unique identifier that identifies the unit of the column dimension corresponding to the cells. The second dimensions coordinates Y1-Y7 may be inserted as markup attributes in the markup language file. As the population hierarchical table includes thirty five cells, thirty five markup attributes may be inserted in the markup language file corresponding to the thirty five cells in the population hierarchical table. The markup tags and the markup attributes inserted in the markup language file together identify the position of each cell in the hierarchical table. Table 2 illustrates the markup language file obtained after inserting the markup tags and the markup attributes corresponding to the cells in the population hierarchical table. Each of the tag-attribute pair X1 Y1, X1 Y2 . . . in the table 2 is a position of a cell in the population hierarchical table.

TABLE 2

| <X1 | Y1 | Y2 | Y3 | Y4 | Y5 | Y6 | Y7 /> |
|---|---|---|---|---|---|---|---|
| <X2 | Y1 | Y2 | Y3 | Y4 | Y5 | Y6 | Y7 /> |
| <X3 | Y1 | Y2 | Y3 | Y4 | Y5 | Y6 | Y7 /> |
| <X4 | Y1 | Y2 | Y3 | Y4 | Y5 | Y6 | Y7 /> |
| <X5 | Y1 | Y2 | Y3 | Y4 | Y5 | Y6 | Y7 /> |

In one embodiment, the markup attributes may be inserted, in the markup language file, corresponding to only those cells of the hierarchical table that include data. In the above example, for the first row of the population hierarchical table only two markup attributes Y4 and Y7 may be inserted in the markup language file, as only the fourth cell and the seventh cell in the first row, of the population hierarchical table, store data. In this case, the first line of the markup language may include <X1 Y4 Y7 />. In one embodiment, the markup language file, storing the hierarchical table, is a flat markup language file. A flat markup language file may include markup elements for storing the hierarchical table. Each markup element, in the flat markup language file, represents cells corresponding to a single unit of the first dimension. A markup element includes a markup tag and markup attributes corresponding to the markup tag for storing data. In the markup language file, shown in table 2, each line of the markup language file is a markup element that includes markup tag and attributes representing position of the cells corresponding to one unit of the rows dimension (first dimension). For example, the first line <X1 Y1 Y2 Y3 Y4 Y5 Y6 Y7 /> is a markup element representing the position of the cells included in one unit (first row) of the row dimension corresponding to the population hierarchical table shown in Table 1.

Next at block 210, the cells corresponding to the first dimension, of the hierarchical table, may be sequentially selected from the hierarchical table. The first dimension of the hierarchical table may be the row dimension or the column dimension of the hierarchical table. In one embodiment, the first dimension may be the dimension corresponding to the first dimension coordinate that has been inserted as a markup tag in the markup language file at block 206. In one embodiment, cells corresponding to one unit of the first dimension may be sequentially selected from the hierarchical table. In the above example, the cells corresponding to each unit of the row dimension (e.g., first dimension) of the population hierarchical table may be selected, one at a time. Initially the cells corresponding to the first row, which is one unit of the first (row) dimension, of the hierarchical table may be selected. Next, the cells corresponding to the second row, which is another unit of the first (row) dimension, of the hierarchical table may be selected.

Next at block 212 the data stored in the cells, selected at block 210, of the hierarchical table may be identified. In one embodiment, the metadata of the data stored in the selected cells may also be identified along with the data. The metadata is data about data. Metadata may describe information about when, or by whom a particular set of data was collected, or whether data can be edited, or any other additional information related to the data. In the above example, the data identified for the selected cells in the first row of the population hierarchical table is "EUROPE" and "USA". The metadata related to the data "EUROPE" is "V", which indicates that the data "EUROPE" can be expanded and the metadata for the data "USA" is "▷", which indicates that the data "USA" can be collapsed.

In one embodiment, the hierarchical information of the selected cells may also be identified. Hierarchical information may include information related to the different parent/child relationships in the hierarchical table. In the above example, the hierarchical information related to the cells 5 and 6, in row 2 of the population hierarchical table, which stores "GERMANY" and "FRANCE" may be that cells 5 and 6, in row 2, are child of the cell 4, in row 1, which stores the data "EUROPE".

Finally at block 214 the data, identified at block 212, included in the selected cells of the hierarchical table may be stored in the markup attributes inserted in the markup language file at block 208. In one embodiment, the identified data and metadata of a selected cell may be stored in the inserted markup attribute, which is the second dimension coordinate of the selected cell, corresponding to the selected cell of the hierarchical table. The data and the metadata of the cell stored in the markup attribute may be separated by a delimiter, for example a "|". In the above example, the first line of the markup language file after storing the data and metadata of the selected cells of the first row may include <X1 Y1=" " Y2=" " Y3=" " Y4="EUROPE|E" Y5=" " Y6=" " Y7="USA|C"/>, where "E" and "C" represent the metadata expand and collapse, respectively, corresponding to the data "EUROPE" and "USA" included in the fourth cell and the seventh cell, respectively, of the hierarchical table. Table 3 illustrates the markup language file obtained after storing the data and metadata, of all the cells in the hierarchical table, in the markup attributes of the markup language file. The markup language file shown in Table 3 stores the hierarchical table shown in Table 1, in a two dimensional representation, and does not require the markup language file to use hierarchical structure to store the structure of hierarchical table shown in Table 1.

TABLE 3

| |
|---|
| <X1 Y1 = "" Y2 = "" Y3 = "" Y4 = "EUROPE | E" Y5 = "" Y6 = "" Y7 = "USA | C" /> |
| <X2 Y1 = "" Y2 = "" Y3 = "" Y4 = "" Y5 = "GERMANY | C" Y6 = "FRANCE | C" Y7 = "" /> |
| <X3 Y1 = "ALL AGES | E" Y2 = "" Y3 = "" Y4 = "150 | M" Y5 = "75 | M" Y6 = "75 | M" Y7 = "200 | M" /> |
| <X4 Y1 = "" Y2 = "AGES < 50 | E" Y3 = "" Y4 = "100 | M" Y5 = "50 | M " Y6 = "50 | M" Y7 = "150 | M" /> |
| <X5 Y1 = "" Y2 = "" Y3 = "AGES < 25 | C' Y4 = "50 | M" Y5 = "25 | M" Y6 = "25 | M" Y7 = "100 | M" /> |

In another embodiment, the hierarchical information related to the selected cells, of the hierarchical table, may also be stored in the markup attribute along with the data and the metadata stored in the markup attributes. In this case, the hierarchical information of the hierarchical table may not be stored by organizing the structure of the markup language file in the hierarchical order of the table. Rather, the hierarchical information is concatenated with the data and the metadata of the cell and stored in the markup attribute corresponding to the cell. In one embodiment, the hierarchical information, parent-child relationship, of the hierarchical table may be stored by storing attributes names of the parent attribute, storing parent data, in the child attribute, storing child data. In the above example, the hierarchical information of the selected cells in the markup language file may be that data "EUROPE" stored in cell 4 of the first row is a parent of the data "GERMANY" and "FRANCE" stored in cells 5 and 6 of the second row in the hierarchical table. In this case, the attribute name Y4 of the attribute storing parent data "EUROPE" may be stored in the attributes Y5 and Y6 of the markup language file storing the child data "GERMANY" and "FRANCE". In this case, the first line of the markup language file may include <X1 Y1=" " Y2=" " Y3=" " Y4="EUROPE|E" Y5="GERMANY|C|Y4" Y6="FRANCE|C|Y4" Y7="USA|C" />. A parser parsing this line of the markup language file will understand that the data stored in the markup attributes Y5 and Y6 are child elements of the data stored in the markup attribute Y4 and therefore has to be placed in the fifth and sixth cell of the second row in the hierarchical table.

Figure 3:
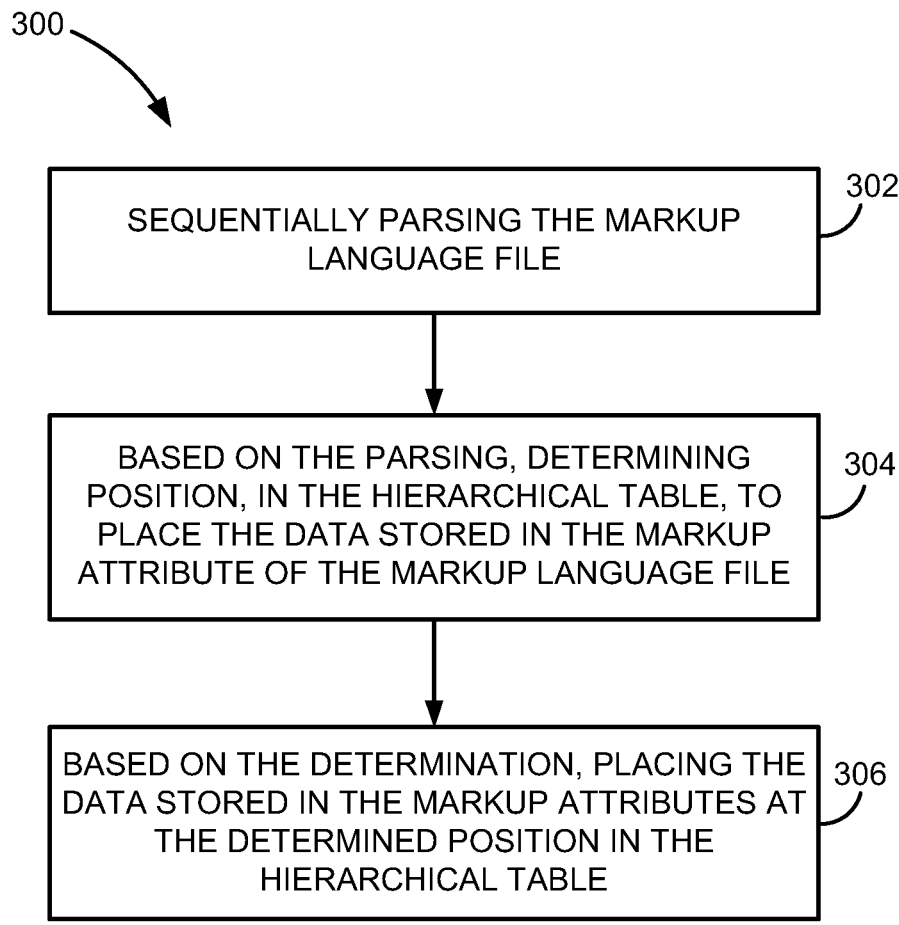
FIG. 3 is a flow diagram illustrating a method for obtaining the hierarchical table from the markup language file, according to an embodiment.

FIG. 3 is a flow diagram 300 illustrating a method for obtaining the hierarchical table from the markup language file, according to an embodiment. The markup language file may be storing the hierarchical table. Initially at block 302 the markup language file, storing the hierarchical table, may be sequentially parsed. Sequentially parsing the hierarchical table may include parsing each line of the hierarchical table one at a time. In one embodiment, sequentially parsing the markup language may include parsing one markup element in the markup language file at a time. A markup language parser may parse the markup language file by analyzing the elements included in the markup language file. Based on the parsing of the markup language file, the markup language parser determines the position, in the hierarchical table, to place the data stored in the markup attributes inserted in the markup language file (block 304). As discussed above, the markup language file includes markup attributes, corresponding to each cell of the hierarchical table, which stores the data included in the cells of the hierarchical table. The markup language parser may determine the position, in the hierarchical table, based on the markup attribute, storing the data, and the markup tag corresponding to the markup attribute. Each markup tag-attribute pair, in the markup language file, represents the first dimension coordinate and the second dimension coordinate, respectively, of the position, in the hierarchical table, where the data stored in the markup attribute is to be placed. In one embodiment, the identified position is the position of the cell, in the hierarchical table, at which the data, stored in the markup attribute, is to be placed. In one embodiment, the position in the hierarchical table may be identified to place the metadata of the data, stored in the markup attribute, along with the data at the identified position in the hierarchical table.

In the above example, the first line of the markup language file, shown in table 3, may be parsed to identify the position for placing data (" ") stored in the markup attribute Y1 corresponding to markup tag X1. Based on the parsing, the first cell, of the hierarchical table, having dimension coordinates X1 Y1 is identified as the position for placing the data (" ").

As discussed above the first dimension axis may also be inserted as a markup tag in the markup language file. In this case, the markup language parser may identify the first dimension coordinate, of the cell positions in the hierarchical table, based on the parsing count of the parser. As discussed above, the markup language parser parses one line at a time. Therefore, the parsing count of the parser may be incremented by 1 for each line in the markup language file. The markup language file may identify the first dimension coordinate, of the cell positions in the hierarchical table, based on the first dimension axis, inserted as markup tag in the markup language file, and the parsing count of the parser. For example, consider a hierarchical table that has a first dimension axis as the X-axis. The parser may initially parse the first line of the markup language file that may include <X Y1=" " Y2=" "/>. The parser may then identify the first dimension coordinate, of the cell positions represented by the markup tag X, as X1, based on the first dimension axis (X) and the parsing count of the parser, which is 1. Similarly the markup language parser may identify the first dimension coordinate for the cells represented by the attributes in the second line of the markup language file as X2, because the first dimension axis, inserted as markup tag in the markup language file, is X and the parsing count of the parser is 2.

Finally at block 306 the data stored in the markup attribute, included in the markup language file, may be placed at the positions, determined at block 304, of the hierarchical table. In the above example, the data (" ") stored in the markup attribute Y1 may be stored at the position X1Y1 of the hierarchical table. Similarly, the parser may determine the positions, in the hierarchical table, to place the other data items stored in the markup attributes, inserted in the markup language file, to obtain the hierarchical table. As the parser does not require any hierarchical information (parent-child relationship) of the hierarchical table, during the parsing, it is able to quickly parse the markup language file to obtain the hierarchical table.

In another embodiment, the parser may determine the hierarchical information stored in the markup attributes, along with the data and the metadata, stored in the markup attribute, and obtain the hierarchical table based on the hierarchical information stored in the markup language file. In the above example, the parser may parse the first line of the hierarchical table that includes <X1 Y1=" " Y2=" " Y3=" " Y4="EUROPE|E" Y5="GERMANY|C|Y4" Y6="FRANCE|C|Y4" Y7="USA|C" /> to identify that the data "GERMANY" and "FRANCE" stored at attributes Y5 and Y6, respectively, are children of the data "EUROPE" stored in the attribute Y4, which is the parent. In this case, the parser may position the children data "GERMANY" and "FRANCE" at positions having a first dimension coordinates as X2 instead of X1 to show the hierarchical (parent-child) relationship between the children data "GERMANY" and "FRANCE" and the parent data "EUROPE", which is stored at a position, X1 Y4, having a first dimension coordinate as X1.

Figure 4:
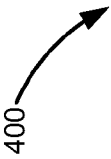
FIG. 4 is a block diagram illustrating an exemplary hierarchical table, according to an embodiment.

FIG. 4 is a block diagram illustrating an exemplary hierarchical table 400, according to an embodiment. The hierarchical table 400 illustrates the number of products sold in the first quarter of 2012. The row dimension of the hierarchical table 400 includes nine rows. The column dimension of the hierarchical table includes nine columns The row dimension of the hierarchical table 400 has two levels of hierarchy represented by parent ("Food")—child ("Cookie, "Sandwich") relationship. The column dimension, of the hierarchical table 400, also has two levels of hierarchy represented by parent ("January")—child ("Week 1", "Week 2", "Week 3", AND "Week 4") relationship. The hierarchical table 400 includes 54 cells. The hierarchical table 400 may be stored as a markup language file, such as a XML file, for transporting the hierarchical table 400.

Initially, for storing the hierarchical table as a markup language file, the 54 cells of the hierarchical table 400 may be parsed, one by one, to identify the first dimension coordinate and the second dimension coordinate of each of the 54 cells in the hierarchical table. In this case, the row dimension and the column dimension are assumed to be the first dimension and the second dimension, respectively, of the hierarchical table 400. The row dimension of the hierarchical table 400 is along the X-axis. Therefore, the X-axis is the first dimension axis of the hierarchical table 400. Similarly, the column dimension of the hierarchical table 400 is along the Y-axis, which is the second dimension axis of the hierarchical table 400. The first dimension coordinate (row dimension coordinate) and the second dimension coordinate (column dimension coordinate) of each of the cell in the hierarchical table 400 may be determined with reference to the X-axis and the Y-axis, respectively.

FIG. 5 is a block diagram illustrating an exemplary markup language file 500 storing the hierarchical table 400 of FIG. 4, according to an embodiment. The markup language file 500 is obtained by inserting the row dimension axis (X-axis) of the hierarchical table 400 of FIG. 4 as a markup tag in the markup language file. Further, the column dimension coordinate of each of the fifty four cells in the hierarchical table may be inserted as markup attributes, corresponding to the markup tags, in the markup language file 500. The markup language file 500 includes fifty four markup attributes corresponding to the fifty four cells included in the hierarchical table 400 of FIG. 4. Each pair of the row dimension axis and the column dimension coordinate, inserted in the markup language file, represent position of one of the cells in the hierarchical table 400 of FIG. 4. The obtained markup language file 500 includes position of each of the cells in the hierarchical table and the data stored in the cells of the hierarchical table 400 of FIG. 4. A markup language parser may parse the markup language file 500 and easily obtain the hierarchical table 400 of FIG. 4 based on the position information and data stored in the markup language file 500.

FIG. 6 is a block diagram illustrating an exemplary markup language file storing the hierarchical table 400 of FIG. 4, according to another embodiment. In one embodiment, the markup language file 600 stores position information of the cells, in the hierarchical table 400 of FIG. 4, which store data. For example, the first row of the hierarchical table 400 of FIG. 4 has only three cells, cell 3, cell 8, and cell 9, storing data. In this case, the first line of the markup language file 600, which stores the position information and data of the cells in the first row of the hierarchical table 400 of FIG. 4, has only three attributes Y3, Y8 and Y9 that along with the markup tag X stores the position information of the three cells, cell 3, cell 8, and cell 9, in the first row of the hierarchical table 400 of FIG. 4.

FIG. 7 is a block diagram illustrating an exemplary markup language file 700 storing the hierarchical table 400 of FIG. 4, according to another embodiment. The markup language file 700 stores the hierarchical information, of the hierarchical table 400 of FIG. 4, in the markup attributes, of the markup language file 700, along with the data and the metadata of the hierarchical table 400 of FIG. 4. In one embodiment, the hierarchical information of the hierarchical table 400 of FIG. 4 may be stored in the markup language file 700 of FIG. 7, by storing attributes names of the attribute storing parent data in the attributes, of the markup language file, storing child data. For example, the attribute Y3 in the first line of the markup language file 700 corresponds to the third cell in the first row of the hierarchical table 400 of FIG. 4, which stores the parent data "January". Further, the attributes Y4-Y7, in the second line of the markup language file 700 corresponds to the fourth-seventh cells in the second row of the hierarchical table that store the children data Week 1-4 of the parent data "January." In this case, the attribute name Y3 of the parent attribute, storing the parent data "January", may be stored in the child attributes Y4-Y7, storing the children data Week 1-Week 4, respectively, to store the hierarchical information. The first line of the markup language file 700 storing this hierarchical information may include <X Y1=" "Y2=" "Y3="January|E" Y4="WEEK 1|C|Y3" Y5="WEEK 2|c|Y3" Y6="WEEK 3|C|Y3" Y7="WEEK 4|C|Y3" Y8="FEB|C" Y9="MARCH|C"/>. A parser parsing this line of the markup language file may, based on the hierarchical information, understand that the children data WEEK 1-WEEK 4 has to be placed in the second row of the hierarchical table below the parent data "JANUARY".

Some embodiments may include the above-described methods being written as one or more software components. These components, and the functionality associated with each, may be used by a client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
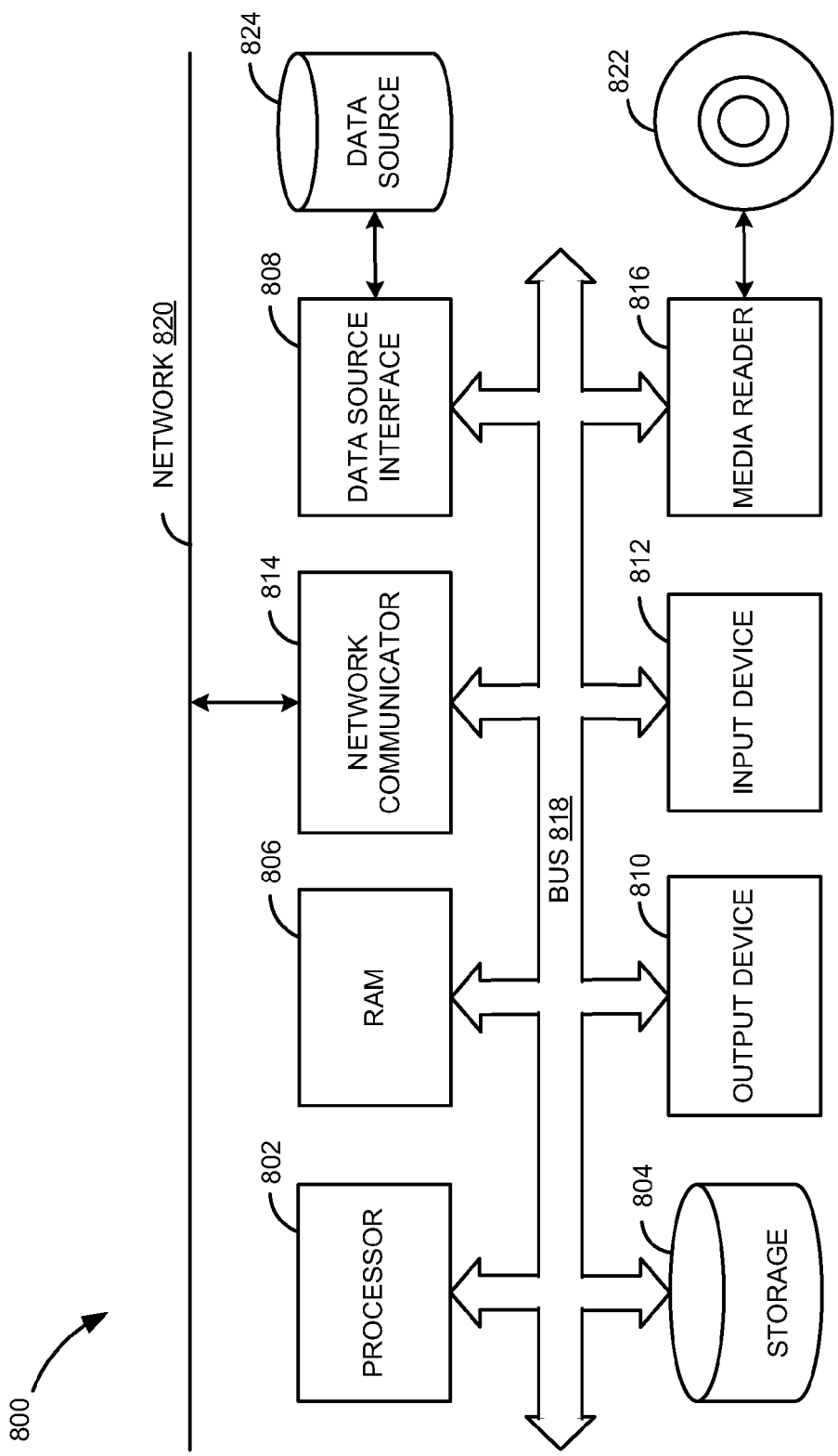
FIG. 8 is a block diagram illustrating a computing environment in which the techniques described for storing a hierarchical table as a markup language file can be implemented, according to an embodiment.

FIG. 8 is a block diagram of an exemplary computer system 800. The computer system 800 includes a processor 802 that executes software instructions or code stored on a computer readable storage medium 822 to perform the above-illustrated methods. The computer system 800 includes a media reader 816 to read the instructions from the computer readable storage medium 822 and store the instructions in storage 804 or in random access memory (RAM) 806. The storage 804 provides a large space for keeping static data where at least some instructions could be stored for later execution. The stored instructions may be further compiled to generate other representations of the instructions and dynamically stored in the RAM 806. The processor 802 reads instructions from the RAM 806 and performs actions as instructed. According to one embodiment, the computer system 800 further includes an output device 810 (e.g., a display) to provide at least some of the results of the execution as output including, but not limited to, visual information to users and an input device 812 to provide a user or another device with means for entering data and/or otherwise interact with the computer system 800. Each of these output devices 810 and input devices 812 could be joined by one or more additional peripherals to further expand the capabilities of the computer system 800. A network communicator 814 may be provided to connect the computer system 800 to a network 820 and in turn to other devices connected to the network 820 including other clients, servers, data stores, and interfaces, for instance. The modules of the computer system 800 are interconnected via a bus 818. Computer system 800 includes a data source interface 808 to access data source 824. The data source 824 can be accessed via one or more abstraction layers implemented in hardware or software. For example, the data source 824 may be accessed by network 820. In some embodiments the data source 824 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

The invention claimed is:

1. A computer implemented method for storing a hierarchical table as a markup language file, the method comprising:

identifying, by a processor of the computer, position of a plurality of cells included in the hierarchical table, the position of one or more cells of the plurality of cells including a first dimension coordinate and a second dimension coordinate;

inserting, by the processor of the computer, the first dimension coordinate as a markup tag in the markup language file;

inserting, by the processor of the computer, the second dimension coordinate as a markup attribute, corresponding to the markup tag, in the markup language file;

identifying, by the processor of the computer, data included in the selected the one or more cells;

identifying, by the processor of the computer, hierarchical information associated to the one or more cells; and storing the data included in the one or more cells and the hierarchical information associated to the one or more cells in the markup attribute.

2. The computer implemented method according to claim 1, further comprising:

parsing, by the processor of the computer, the plurality of cells included in the hierarchical table; and based on the parsing, identifying, by the processor of the computer, the first dimension coordinate and the second dimension coordinate of the plurality of cells included in the hierarchical table.

3. The computer implemented method according to claim 1, wherein inserting the markup tag and the markup attribute includes:

inserting the markup tag and the markup attribute in a flat markup language file that has a non-hierarchical structure.

4. The computer implemented method according to claim 1, further comprising:

identifying, by the processor of the computer, metadata related to the data included in the selected one or more cells; and storing, in the memory of the computer, the identified metadata related to the data in the markup attribute.

5. The computer implemented method according to claim 1, further comprising:

identifying, by the processor of the computer, a first dimension axis of the plurality of cells in the hierarchical table; and inserting, by the processor of the computer, the identified first dimension axis as the markup tag in the markup language file.

6. The computer implemented method according to claim 1, further comprising obtaining the hierarchical table from the markup language file, where obtaining the hierarchical table includes:

sequentially parsing, by the processor of the computer, the markup language file;

based on the parsing, determining the position, in the hierarchical table, to place the data stored in the markup attribute of the markup language file; and based on the determination, placing the data stored in the markup attribute, of the markup language file, at the determined position in the hierarchical table.

7. The computer implemented method according to claim 1, wherein storing the hierarchical information includes:

storing, in the processor of the computer, a markup attribute name of a markup attribute corresponding to a parent cell, from the one or more cells, in a markup attribute corresponding to a child cell, from the one or more cells.

8. A computer system for storing a hierarchical table as a markup language file comprising:
   a memory to store a program code; and
   a processor communicatively coupled to the memory, the processor configured to execute the program code to:
      identify position of a plurality of cells included in the hierarchical table, the position of one or more cells of the plurality of cells including a first dimension coordinate and a second dimension coordinate;
      insert the first dimension coordinate as a markup tag in the markup language file;
      insert the second dimension coordinate as a markup attribute, corresponding to the markup tag, in the markup language file;
      identify data included in the one or more cells;
      identify hierarchical information associated to the one or more cells; and
      store the data included in the selected one or more cells and the hierarchical information associated to the one or more cells in the markup attribute.

9. The computer system of claim 8, wherein the processor further executes the program code to:
   parse the plurality of cells included in the hierarchical table; and
   based on the parsing, identify the first dimension coordinate and the second dimension coordinate of the plurality of cells included in the hierarchical table.

10. The computer system of claim 8, wherein the processor further executes the program code to:
    insert the markup tag and the markup attribute in a flat markup language file that has a non-hierarchical structure.

11. The computer system of claim 8, wherein the processor further executes the program code to:
    identify metadata related to the data included in the selected one or more cells; and
    store the identified metadata related to the data in the markup attribute.

12. The computer system of claim 8, wherein the processor further executes the program code to:
    identify a first dimension axis of the plurality of cells in the hierarchical table; and
    insert the identified first dimension axis as the markup tag in the markup language file.

13. The computer system of claim 8, wherein the processor further executes the program code to:
    sequentially parse the markup language file;
    based on the parsing, determine a position, in the hierarchical table, to place the data stored in the markup attribute of the markup language file; and
    based on the determination, placing the data stored in the markup attribute, of the markup language file, at the determined position in the hierarchical table.

14. The computer system of claim 8, wherein the processor further executes the program code to:
    store a markup attribute name of a markup attribute corresponding to a parent cell, from the one or more cells, in a markup attribute corresponding to a child cell, from the one or more cells.

15. An article of manufacture including a non-transitory computer readable storage medium to tangibly store instructions, which when executed by a computer, cause the computer to:
    identify position of a plurality of cells included in the hierarchical table, the position of one or more cells of the plurality of cells including a first dimension coordinate and a second dimension coordinate;
    insert the first dimension coordinate as a markup tag in the markup language file;
    insert the second dimension coordinate as a markup attribute, corresponding to the markup tag, in the markup language file;
    identify data included in one or more cells;
    identify hierarchical information associated to the one or more cells; and
    store the data included in the selected one or more cells and the hierarchical information associated to the one or more cells in the markup attribute.

16. The article of manufacture according to claim 15, further comprising instructions which when executed by the computer further causes the computer to:
    parse the plurality of cells included in the hierarchical table; and
    based on the parsing, identify the first dimension coordinate and the second dimension coordinate of the plurality of cells included in the hierarchical table.

17. The article of manufacture according to claim 15, further comprising instructions which when executed by the computer further causes the computer to:
    insert the markup tag and the markup attribute in a flat markup language file that has a non-hierarchical structure.

18. The article of manufacture according to claim 15, further comprising instructions which when executed by the computer further causes the computer to:
    identify metadata related to the data included in the selected one or more cells; and
    store the identified metadata related to the data in the markup attribute.

19. The article of manufacture according to claim 15, further comprising instructions which when executed by the computer further causes the computer to:
    identify a first dimension axis of the plurality of cells in the hierarchical table; and
    insert the identified first dimension axis as the markup tag in the markup language file.

20. The article of manufacture according to claim 15, further comprising instructions which when executed by the computer further causes the computer to:
    sequentially parse the markup language file;
    based on the parsing, determine a position, in the hierarchical table, to place the data stored in the markup attribute of the markup language file; and
    based on the determination, placing the data stored in the markup attribute, of the markup language file, at the determined position in the hierarchical table.

21. The article of manufacture according to claim 15, further comprising instructions which when executed by the computer further causes the computer to:
    store a markup attribute name of a markup attribute corresponding to a parent cell, from the one or more cells, in a markup attribute corresponding to a child cell, from the one or more cells.

* * * * *